D. L. Dickson
Harrow.
Nº 74673. Patented Feb. 18, 1868.
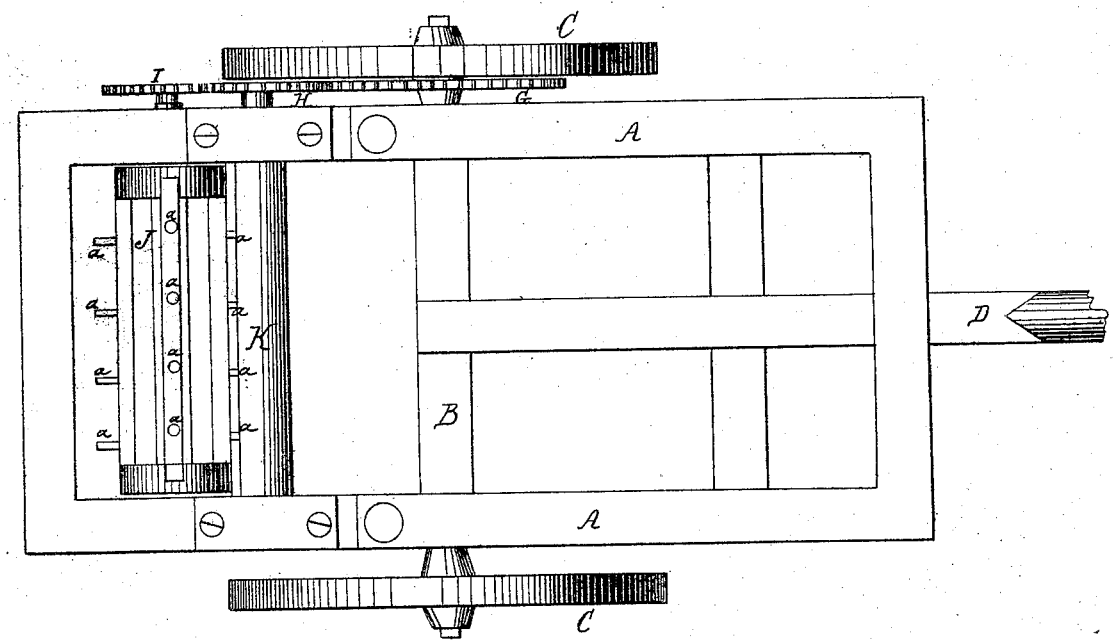
Witnesses
Inventor
D. L. Dickson
her
Alexander Thomason
att.

United States Patent Office.

DANIEL L. DICKSON, OF DURHAM, ILLINOIS.

Letters Patent No. 74,673, dated February 18, 1868.

---

IMPROVEMENT IN HARROWS.

---

The Schedule referred to in these Letters Patent and making part of the same.

---

TO ALL WHOM IT MAY CONCERN:

Be it known that I, DANIEL L. DICKSON, of Durham, in the county of Hancock, and in the State of Illinois, have invented certain new and useful Improvements in Harrows; and do hereby declare that the following is a full, clear, and exact description thereof, reference being had to the accompanying drawings and to the letters of reference marked thereon.

In the annexed drawings, making part of this specification, A represents a frame, which is supported by the axle B, which, in turn, is supported and carried by the wheels C C. Upon the hub of one of the wheels C is a gear-wheel, G, which meshes into an idle-wheel, H, which gears into a gear-wheel, I.

K represents a horizontal shaft, upon one end of which is the wheel H. This shaft is secured within suitable bearings on the frame A, directly in front of the cylinder J, and revolves inwardly, as the cylinder revolves, by means of the cogs I H G. This shaft may or may not be provided with teeth on its surface, and, in either instance, is intended as a clearer for the cylinder-teeth, causing the removal of weeds and other obstructions, to allow the teeth to effectually operate.

The gear-wheel I is upon one end of a shaft, which lies across the frame A, at its rear end, and which has upon it, or surrounding it, a cylinder, J. This cylinder J is provided, upon its periphery, with several rows or series of teeth, a a. D represents the tongue of the machine.

When this machine is drawn forward, the wheel G communicates motion to idle-wheel H, and it, in turn, to the wheel I, which causes the cylinder J to revolve. The teeth of this cylinder catch into and tear up the earth as the machine moves forward.

The teeth may be made to cut deeper or shallower in the earth, by lifting or lowering the tongue of the machine, or the cylinder may be provided with adjustable bearings, which may be raised or lowered to suit the nature of the case.

I am aware that a cylinder with teeth on its surface, and operating in a frame, is not new.

What I claim as new, and desire to secure by Letters Patent, is—

The combination of the frame A with cylinder J, with teeth a a and clearer K, in front of said cylinder, the whole arranged and operating as specified.

In testimony that I claim the foregoing, I have hereunto set my hand, this 1st day of November, 1867.

DANIEL L. DICKSON.

Witnesses:
   U. D. TAYLOR,
   B. H. HEATH.